(12) United States Patent
Yalovsky

(10) Patent No.: US 7,360,157 B1
(45) Date of Patent: Apr. 15, 2008

(54) ALIGNING CONTENT IN AN ELECTRONIC DOCUMENT

(75) Inventor: Mark Yalovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 10/664,500

(22) Filed: Sep. 19, 2003

(51) Int. Cl.
*G06F 15/00* (2006.01)
*G06F 17/00* (2006.01)
*G06F 3/048* (2006.01)

(52) U.S. Cl. .................. 715/530; 715/525; 715/857

(58) Field of Classification Search ............. 715/530, 715/517, 519, 520, 200, 228, 234, 244, 245, 715/246, 251, 253, 255, 256, 273, 856, 857, 715/858; 707/100
See application file for complete search history.

(56) References Cited

U.S. PATENT DOCUMENTS

| | | | | |
|---|---|---|---|---|
| 5,559,942 A | * | 9/1996 | Gough et al. ............. | 715/802 |
| 5,590,257 A | * | 12/1996 | Forcier ..................... | 715/530 |
| 5,613,019 A | * | 3/1997 | Altman et al. ............ | 382/189 |
| 5,633,957 A | * | 5/1997 | Robinson .................. | 382/292 |
| 5,778,402 A | * | 7/1998 | Gipson ...................... | 715/530 |
| 5,798,752 A | * | 8/1998 | Buxton et al. ............ | 715/863 |
| 5,857,212 A | * | 1/1999 | Van De Vanter ......... | 715/519 |
| 6,088,481 A | * | 7/2000 | Okamoto et al. ......... | 382/189 |
| 6,487,567 B1 | * | 11/2002 | Michelman et al. ..... | 715/798 |
| 6,654,035 B1 | * | 11/2003 | DeStefano ................ | 715/798 |
| 6,678,865 B1 | * | 1/2004 | Pratley et al. ............ | 715/509 |
| 7,024,623 B2 | * | 4/2006 | Higashiyama et al. ... | 715/530 |
| 7,043,689 B2 | * | 5/2006 | Linker et al. ............. | 715/526 |
| 7,167,165 B2 | * | 1/2007 | Keely et al. .............. | 345/179 |
| 2002/0032705 A1 | * | 3/2002 | Higashiyama et al. ... | 707/530 |
| 2002/0064308 A1 | * | 5/2002 | Altman et al. ............ | 382/187 |
| 2002/0097270 A1 | * | 7/2002 | Keely et al. .............. | 345/764 |
| 2002/0178008 A1 | * | 11/2002 | Reynar ..................... | 704/272 |
| 2003/0214491 A1 | * | 11/2003 | Keely et al. .............. | 345/179 |

OTHER PUBLICATIONS

H. Nobu, "Two-Cursor System (Both Hands User Interface)," IBM Technical Disclosure Bulletin, vol. 38, No. 2, Feb. 1995.*
"Automatic Adjustment to Placement of Text in Document," IBM Technical Disclosure Bulletin, vol. 27, No. 9, Feb. 1985.*
Antonie et al., "Text Document Categorization by Term Association," IEEE, Dec. 2002, pp. 19-26.*

* cited by examiner

*Primary Examiner*—William Bashore
*Assistant Examiner*—MaiKhanh Nguyen
(74) *Attorney, Agent, or Firm*—Merchant & Gould

(57) ABSTRACT

Aligning the contents of document objects on an electronic document page. Organizing a page of document objects so textual content is aligned to natural eye scanning patterns promotes readership and usability. When a user creates a new island of text, the new text can be snapped into alignment with an existing island of text. Invisible guidelines that emanate from textual features in a document object can provide a relative alignment reference that floats with the position of the object on the page. In response to placing a content insertion point ("IP") on an electronic page with an existing document object, the IP can be automatically aligned to the content of the existing document object. A page with several arbitrarily positioned document objects can be automatically rearranged so that the contents of the document objects are each aligned to one another.

17 Claims, 8 Drawing Sheets

ALIGNING CONTENT IN AN ELECTRONIC DOCUMENT

FIELD OF THE INVENTION

The present invention relates to aligning objects in electronic document pages and more specifically to a method for aligning the content of one object relative to the content of another object.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). One goal for these applications is to replace paper as the simplest means to record and communicate information. However, to replace and enhance paper's utility, the electronic document editor should allow the user to place document objects on a page and to edit, move, resize, and add text and other content, while ensuring that the user can efficiently review the page, clearly scan the individual objects, and readily read the content of each object. Also, unlike typical word processors, a free-form document editor that allows a user to quickly absorb content from multiple objects more closely models paper's utility.

One function that a free-form electronic document editor should have to enhance its utility is the capability to align document objects relative to one another to present a user with an organized view of textual and graphic content. When content on a page is organized and aligned, a user can quickly scan the page to identify information of interest.

A typical word processor presents text in an organized, one-dimensional format. Text is usually entered onto a page beginning at the top left-hand corner and moving in a line, more or less continuously, to the lower right-hand corner of the page. Although this format promotes legibility, it imposes a rigid structure upon the user. Many users find this structural imposition more limiting, and thus less desirable, than traditional pen and paper.

In contrast, a free-form document editor supports document objects, islands of content that can be added anywhere on the two dimensional surface of the page. A document object contains textual and/or graphic content that is grouped together. This content may include text entered by a keyboard or similar device, handwriting entered with a stylus or similar device, a drawing, or a combination of these items. However, if an electronic document contains multiple islands of content and the content of each island is misaligned, then readability can suffer. Consequently, islands of content in an electronic document need to be aligned relative to one another to facilitate a user readily scanning the page to identify information contained therein.

Some word processing programs allow users to place text boxes on a page. A text box is a type of document object that contains textual content presented in the format of a rectangular box or other geometric shape. An electronic document may display textual content inside a rectangular frame so that the text box serves as a content container. However, conventional word processing programs do not generally support automatically arranging these boxes or their content relative to one another so that the content of multiple boxes is uniformly aligned.

A user typically creates a new text box by positioning a pointer, such as a cursor or stylus, at a desired position on the electronic page and entering an insertion point ("IP"). The location of the IP defines the starting point of the content that the user enters. If the user precisely positions the IP, the content of the new text box may be aligned with the content of an existing text box. More commonly, the content in multiple text boxes is not precisely aligned since such manual alignment is tedious. Furthermore, conventional word processing programs generally lack a provision to automatically align a new IP with an existing text box. An electronic page that displays text boxes with misaligned content does not generally promote readership.

One of the advantages of traditional pen and paper is the ease with which information can be rearranged and presented. A user can jot down islands of content at convenient locations on the top sheet of a pad of paper whenever the need arises to record information. The user can then tear off the top sheet and manually transfer the content to a new sheet at a convenient time. The user can arrange the islands during the transfer process so that the content of each island is presented in relative alignment. Users sometimes arrange the overall layout of a page to emphasize specific content, for example placing a dominant island of content in the upper left corner of the page. In a presentation format that features aligned content, the user can quickly scan the sheet to reference information. However, many users find manually transferring information between sheets undesirable. Many users also find manually reorganizing information in electronic documents, which typically offer limited screen space for clearly displaying information, cumbersome. Furthermore, conventional electronic document editors generally lack capabilities to automatically arrange the content of multiple test islands.

What is needed is a capability for automatically positioning one or more document objects in an electronic document so the contents of multiple objects are aligned relative to one another. This capability should also include automatically aligning an IP relative to the content of an existing document object. Such a capability would combine the flexibility of pen and paper with the readability of word processing documents.

SUMMARY OF THE INVENTION

The present invention can provide a computer-implemented method for aligning content on an electronic page. When a user selects a location on an electronic page as the insertion point ("IP") for entering new content, the present invention can adjust the position of the IP so that the new content is aligned with existing content. The method can include adjusting the IP after the user selects the IP position but before the user enters the new content. The method can also include adjusting the IP after the user enters the new content.

In one aspect of the present invention, a computer-implemented method for aligning content on an electronic page includes organizing the electronic page so that the contents of multiple document objects are aligned with respect to one another. The method can include moving specific contents of one or more document objects.

In another aspect of the present invention, a computer-implemented method for aligning content on an electronic page can include creating guidelines and associating them with content features that are relevant to alignment. Guidelines provide alignment guides that facilitate aligning the content of one document object in relation to the content of another document object. The method can include attaching or otherwise aligning vertical guidelines to text features such as a tab stop, a margin, a reflow bar, or other formatting feature. The method can also include attaching or otherwise aligning horizontal guidelines to text features such as a center of a line, a paragraph separator, or title block. When a document object's position on the page changes, guidelines associated with the content of the document object can move along with the document object.

A guideline can include a gravity parameter that defines a distance beyond which the guideline does not influence the placement of a document object or its content. A guideline can either span the entirety of the page or a portion thereof. If content is located beyond the length of a fixed-length guideline, the method can include suppressing the guideline's influence on placement of that content. The method can also include establishing a hierarchy between guidelines to facilitate preferentially aligning content with respect to one guideline rather than another.

In yet another aspect of the present invention, a computer-implemented method for aligning content on an electronic page can include organizing a page of multiple existing document objects by arranging the contents of each document object in relation to one or more other document objects on the page. The method can also include establishing a hierarchy between document objects to facilitate preferentially aligning content with respect to one object over another and/or with respect to one area of the page over another.

The discussion of aligning content presented in this summary is for illustrative purposes only. Various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support aligning the contents of objects, such as the textual contents of document objects, in an electronic document page. Guidelines that emanate from features of the content of a document object support positioning the content of one object into relative alignment with the content of another object. Turning now to the drawings, in which like numerals indicate like elements throughout the several figures, a preferred exemplary embodiment of the invention will be described in detail.

Figure 1:
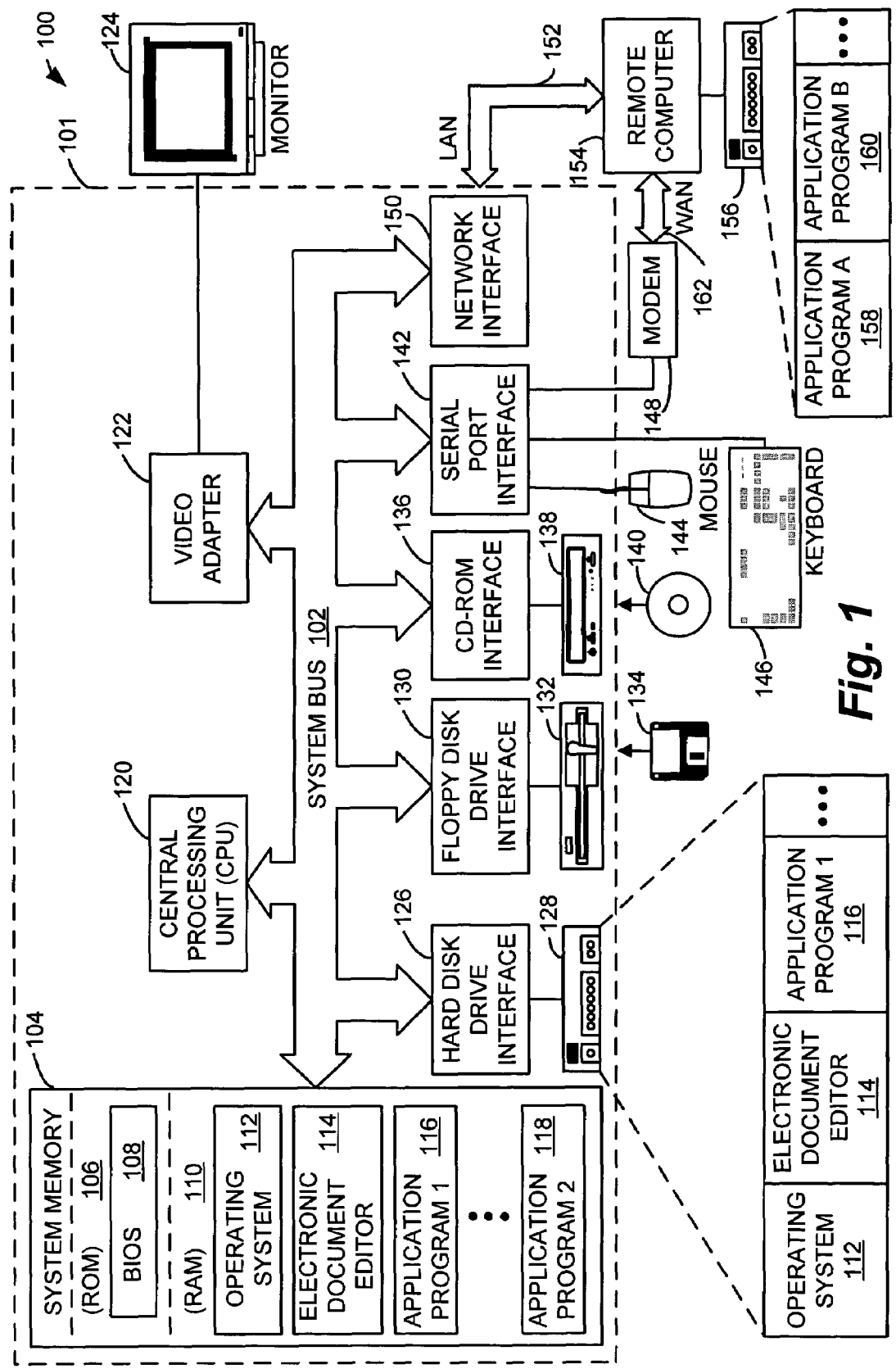
FIG. 1 is a functional block diagram illustrating a representative operating environment for an exemplary embodiment of the present invention.
Figure 2:
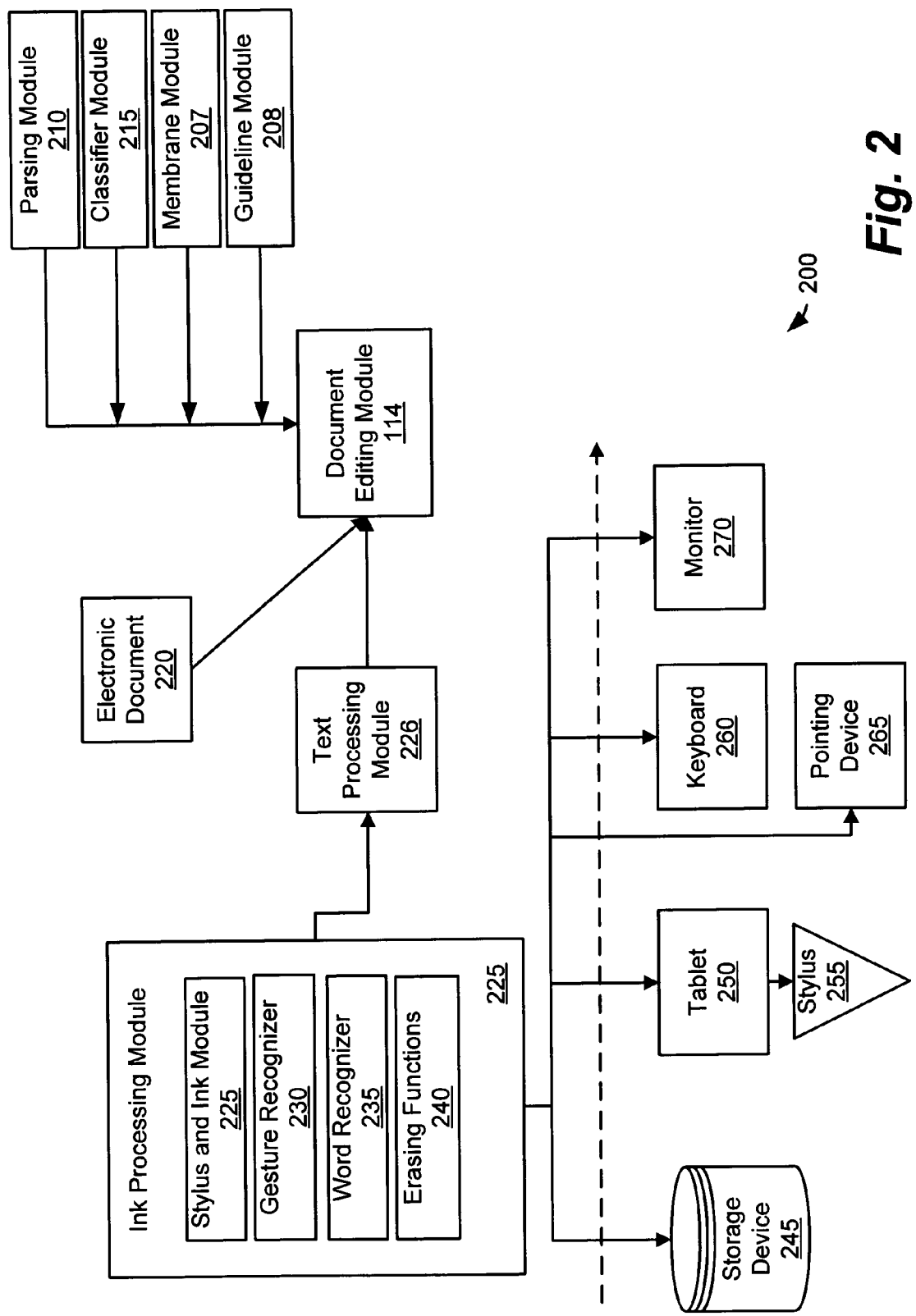
FIG. 2 is a functional block diagram illustrating primary functional components of an exemplary electronic document editor and related input devices for an exemplary embodiment of the present invention.

Exemplary Operating Environment, FIGS. 1-2

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within the personal computer 101, such as during start-up, is stored in ROM 106.

The personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. A hard disk drive 128, a magnetic disk drive 132, and an optical disk drive 138 are connected to a system bus 102 by a hard disk drive interface 120, a floppy disk drive interface 130, and a CD-ROM disk drive interface 136, respectively. Although the exemplary environment described herein employs a hard disk 128, a removable magnetic disk 134, and a removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for the personal computer 101.

A number of program modules may be stored on the hard disk 128, the magnetic disk 134, the optical disk 140, the ROM 106, or the RAM 110, including an operating system 112, an electronic document editor 114, and multiple application programs 116-118. Program modules typically include routines, sub-routines, programs, objects, components, data structures, etc., that perform particular tasks or implement particular abstract data types.

A user may enter commands and information into the personal computer 101 through input devices, such as a keyboard 146 and a pointing device, such as a mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to a processing unit 120 through a serial port interface 142 that is coupled to the system bus 102, but may be connected by other interfaces, such as a parallel port, game port, a universal serial bus (USB), or the like. A display device, such as a monitor 124, may also be connected to the system bus 102 via an interface, such as a video adapter 122. In addition to the monitor, personal computers typically include other peripheral output devices (not shown), such as speakers and printers.

The personal computer 101 may operate in a networked environment using logical connections to one or more remote computers 154. A remote computer 154 may be another personal computer, a server, a client, a router, a network PC, a peer device, or other common network node. While a remote computer 154 typically includes many or all of the elements described above relative to the personal computer 101, FIG. 1 only illustrates a memory storage device 156. The memory storage device 156 may include Application Program A 158 and Application Program B 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to the system bus 102 via a serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

FIG. 2 is a block diagram depicting the primary functional components of an exemplary electronic document editor and related input devices for the representative operating environment of an electronic writing tablet, otherwise described as an electronic tablet. Specifically, FIG. 2 depicts an architecture 200 for an electronic writing tablet in the context of an electronic document editor constructed in accordance with an exemplary embodiment of the present invention. Conventional input devices are represented by the keyboard 260 and the pointing device 265 (e.g., mouse, trackball). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 114 facilitates manipulating electronic ink so that a user can create and modify an electronic document 220 with greater ease and sophistication. The document editing module 114 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Also, the document editing module 114 can seamlessly integrate ink processing, performed by the ink processing module 225, with text processing, performed by a text processing module 226. The text processing module 226 can receive input from the keyboard 260 or a microphone coupled with a voice recognition software program (not shown) or other input device. This seamless integration allows a user a variety of ways to create and edit document objects using the electronic document editor 114 (FIG. 1) and multiple input devices may be used to create or edit a single document object.

A membrane module 207 can create a membrane, also referred to herein as a container, around a document object, delineating the boundary of the document object to support editing the document object. The membrane may be a set geometric shape, such as a rectangle around the entire content of the document object, or may mimic the contours of one or more sides of the document object contents. The interior of the membrane shape may be shaded a contrasting color compared to the background color of the document page and the colors of the document object contents. For example, the interior of a membrane shape may be shaded light gray while a page area may be white and the contents may be black. The shading color may be changed, either automatically by the membrane module 207 or a user, possibly by selecting options from a menu, to enhance the contrast between the document page background, the membrane, and the document object contents. In an alternative embodiment, a membrane may be indicated through a haptic device, in other words, a device that provides tactile responses. The membrane module 207 may indicate which document objects are currently being acted upon by a user by displaying a membrane around that document object or by displaying some other indicator, such as one or more handles on a continually-displayed membrane. Also, the membrane module 207 may create a ghost membrane when an IP is placed on a document page outside an existing document object boundary. This ghost membrane may have a fixed size, shape, and shading. These characteristics may be fixed within the membrane module 207 or, established by the membrane module 207 through a user selecting characteristics for the ghost membrane, such as by selecting items from a menu.

A guideline module 208 can create guidelines that emanate from content features within a document object and serve as floating positional references for the placement of other content on the electronic page. The guidelines adhere to features of the content in a document object, so that if the document object is repositioned on the page, the guidelines follow the document object's movement. Guidelines differ in this respect to a document grid, which is a coordinate system that is fixed to the document, in similar fashion to the writing lines on a sheet of traditional paper.

The guideline module 208 can, for example, establish horizontal guidelines that are fixed to text lines or vertical guidelines that are fixed to tab settings. When multiple guidelines emanate from a single document object, the guideline module 208 can apply rules to the situation to determine the relevance of each guideline for positioning new content. The guideline module 208 can also determine a guideline hierarchy so that content can be positioned according to the guidelines of one document object rather than the guidelines of a less-dominant document object.

Exemplary embodiments of the present invention relate most directly to bringing the contents of multiple document objects into relative alignment with one another. FIGS. 1 and 2 provide a general overview of the environments in which the present invention's use is contemplated.

Figure 3:
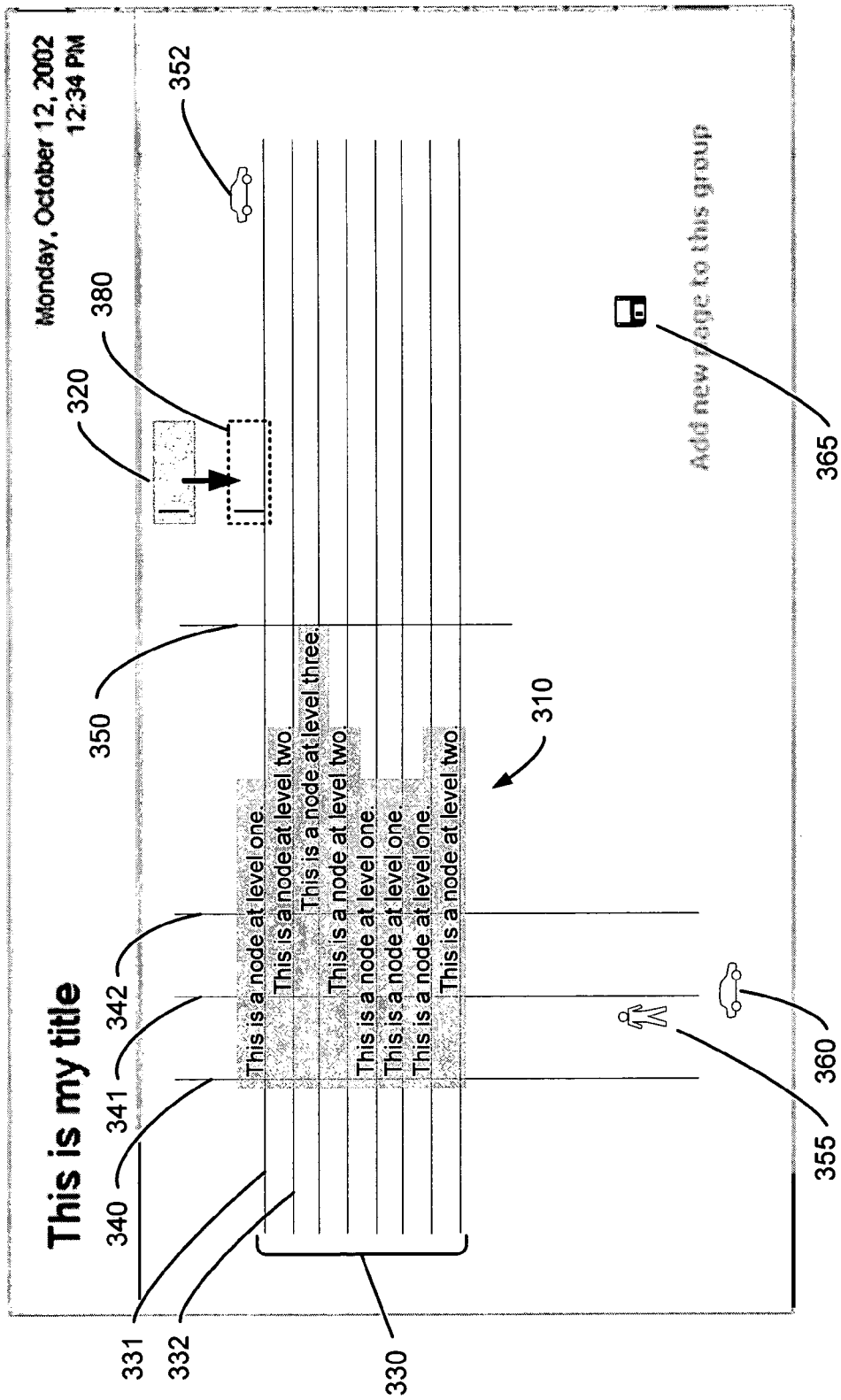
FIG. 3 is a display image of an electronic page illustrating an IP and a document object with guidelines, where the object includes textual content and the guidelines are aligned to features of the textual content in accordance with an exemplary embodiment of the present invention.
Figure 4:
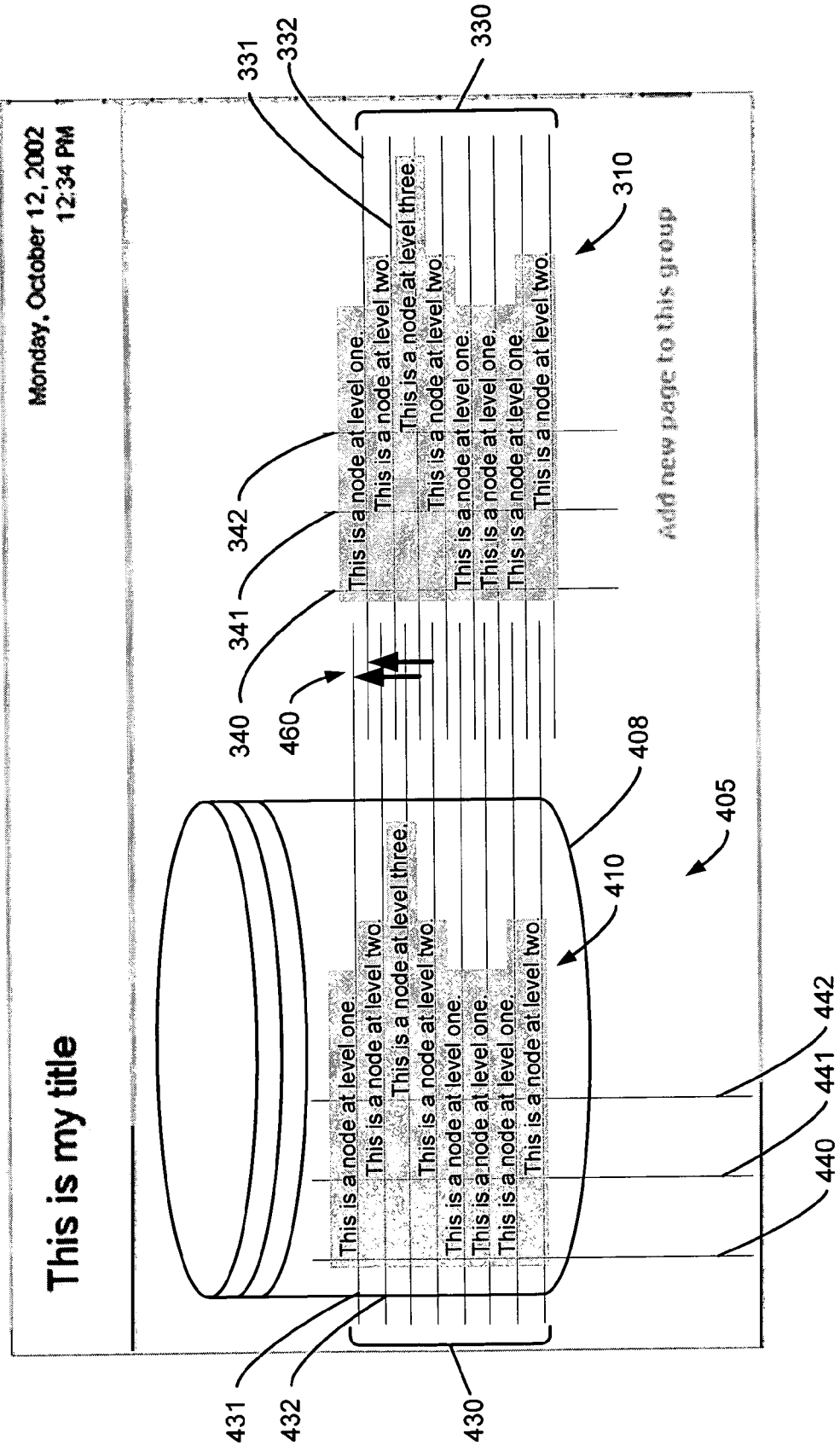
FIG. 4 is a display image of an electronic page illustrating two document objects with guidelines and further illustrating content alignment between the objects in accordance with an exemplary embodiment of the present invention.
Figure 5:
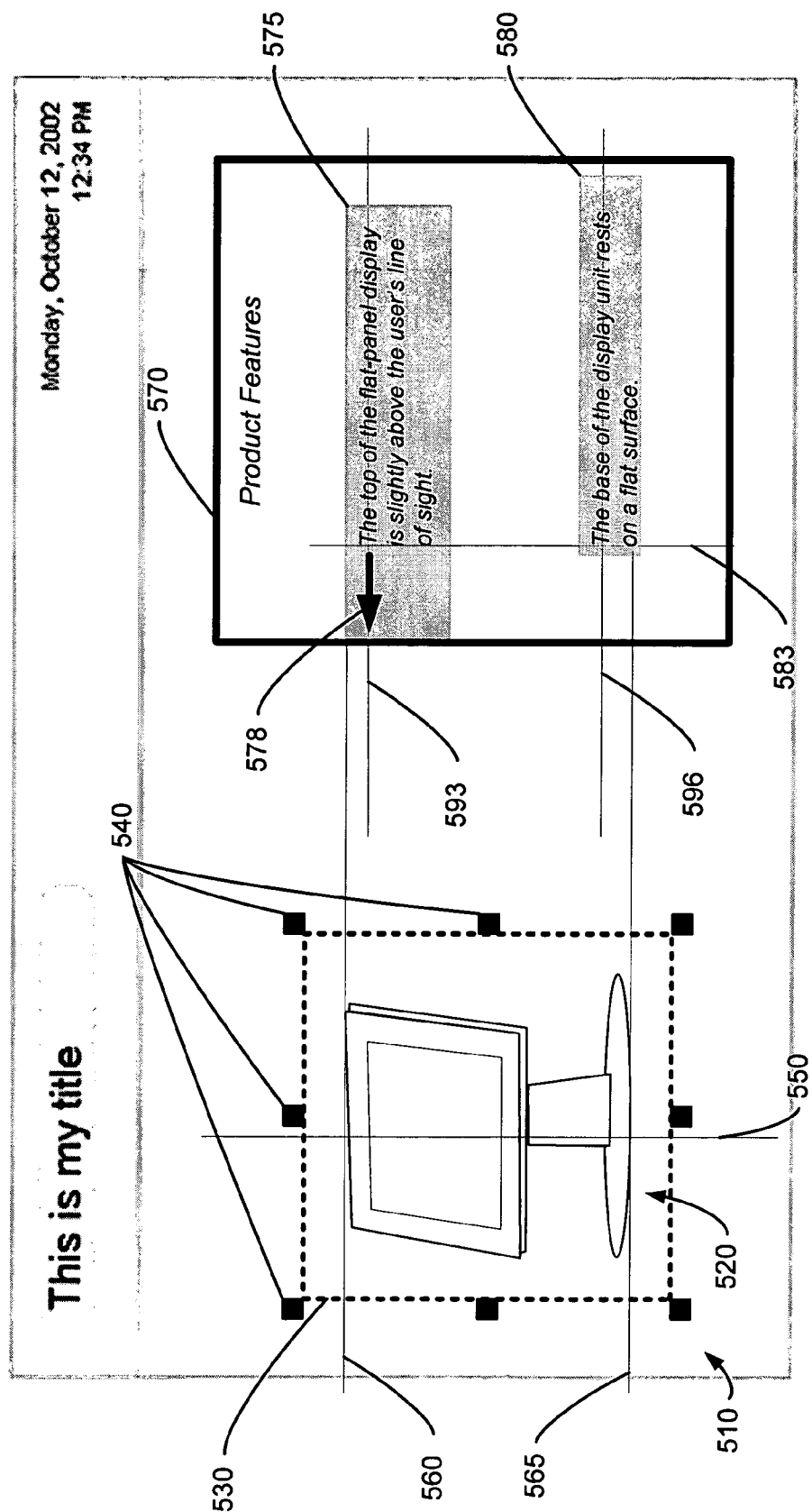
FIG. 5 is a display image of an electronic page illustrating a graphical document object surrounded by a selection box and a text box with guidelines that facilitate content-to-graphic alignment in accordance with an exemplary embodiment of the present invention.

Exemplary Electronic Pages, FIGS. 3-5

FIG. 3 is a display image that depicts an electronic document 300 presenting an existing document object 310 and a new IP 320. This figure illustrates a typical situation in which a user has previously entered an island of content 310 into an electronic document 300 and is now initiating the process of entering a new island of content at the IP 320. As will be described below, the present invention can automatically adjust the IP 320 so that when the user enters new content onto the page 300 the new content is automatically aligned with existing content.

The document object 310 is positioned at an arbitrary location on the page 300. This position could be described in terms of an absolute coordinate system (not shown) of the page 300 that is often referred to as a "grid." Independent of a grid coordinate system, the present invention can use guidelines to reference the placement of new content on the page 300 to the position of the existing document object 310. FIG. 3 depicts Guidelines 330-350 emanating from Document Object 310 that facilitate the placement of new content on the page 300 in relation to the content of Document Object 310. The guidelines 330-350 are attached to the content of the document object 310 so that if a user relocates the document object 310 on the page 300, the guidelines 330-350 move along with the document object 310.

The guidelines 330-350 are vertical and horizontal reference lines that intersect with features of the content that are pertinent to alignment. Horizontal guidelines 330, which are aligned to the lines of text that make up the contents of the document object 310, provide a spatial reference for the vertical placement of other content on the page 300 in relation to that text. Measuring the shortest distance between Guideline 331 and Graphic Element 352 on the page 300, for example, yields the vertical offset between that element 352 and the first line of text in the document object 310. Since Guideline 331 is attached to the content of the document object 310, the guideline 331 moves and the offset changes if the document object 310 moves but the graphic element 352 remains stationary. The offset also changes if the graphic element 352 moves but the document object 310 remains stationary. Similarly, the offset remains constant if the document object 310 and the graphic element 352 move in unison.

Although depicted in FIG. 3 as tracing the bottom of a line of text, horizontal guidelines 330 can provide a reference to a variety of textual and graphic features. For example, a horizontal guideline can be aligned to the center point of a graphic image that is embedded in text or otherwise part of a document object's content. One or more horizontal guidelines can provide a reference to the top of a table that is content in a document object 310. A horizontal guideline can delineate the title bock from the body of a text box that is displayed in an electronic document page 300. A horizontal guideline can indicate the position between two paragraphs or between two sections of content in a document object 310 that contains a body of textual content. A horizontal guideline can be collinear with the 'total sum' line in a spreadsheet of financial data.

In addition to horizontal guidelines 340-342, FIG. 3 illustrates vertical guidelines 340, 341, 342, 350 that are attached to content features in the document object 310. Guideline 340 traces the left-most text location, or left-hand margin, in the document object. In other words, if a user selected the document object 310 and began entering a string of text using a left-justified format, the first letter in the string would be aligned to Guideline 340. Guideline 341 traces the position of the first tab stop, or line indentation, in the content of document object 310. Similarly, Guideline 342 indicates the position of the second tab stop in the content of document object 310.

Guideline 350 is aligned to the reflow bar of the text content in the document object 310. If a user enters a character into a text line of the text block on the left side of Guideline 350, the character remains on that text line. However, if a user enters a character that crosses Guideline 350 from left to right, then the entered character reflows to the next line. Guideline 350 can also indicate the position of text alignment for text in a right-justified format.

Like horizontal guidelines, vertical guidelines can provide a reference to a variety of textual, numeric, and graphical content features. For example, a vertical guideline can delineate between two columns of content. For document objects that present lists of financial numbers, a vertical guideline can indicate the position of a decimal point or a dollar sign in the list.

Vertical guidelines 340-350 facilitate the determination of a horizontal displacement between a content feature and another element on the page 300. For example, measuring the shortest distance between a tab guideline 341 and Graphic Element 355 on the page 300 yields the horizontal displacement between the tab and the graphic element 355.

Although FIG. 3 depicts the guidelines 330-350 as solid lines, in an exemplary embodiment of the present invention, the guidelines 330-350 are not visible on the electronic page 300 to a user. In one embodiment of the present invention, the guidelines 330-350 are present on the page 300 but not visible. In one embodiment of the present invention, each guideline 330-350 is an equation of a line that is coded in software.

In an exemplary embodiment of the present invention as illustrated in FIG. 3, each guideline 330-350 has a fixed length. If an element is positioned on a page 300 beyond the length of a fixed-length guideline 330-350, then the element is outside the measurement bounds of that guideline 330-350. Thus, the length of a fixed-length guideline 330-350 is useful to define a measurement region surrounding a document object 310. Inside the region, displacement of an element relative to a content feature is relevant to the organization of content on the page 300. Outside the region, displacement of an element relative to a content feature is less important to the organization of content on the page 300. For example, Guideline 341 facilitates a measurement of the horizontal displacement between Graphic Element 355 and the first tab stop in the content of the document object 310. In contrast, Graphic Element 360 is outside of Guideline 341's measurement boundary.

In an alternate exemplary embodiment of the present invention, each horizontal guideline 330 spans the full width of the document page 300, and each vertical guideline 340-350 spans the full height of the document page 300. A full-page guideline (not shown) provides a displacement measurement between a feature of a document object 310 and another element on the page 300 regardless of the distance between the document object 310 and the other element. In other words, the measurement boundary of a full-page guideline can encompass the entirety of the page 300. If Guideline 341 was a full-page guideline, then it would facilitate horizontal displacement measurements of both Graphic Element 350 and Graphic Element 360 relative to the first tab stop.

For both full-page guidelines and fixed-length guidelines 330-350, the specifications for each guideline 330-350, can include a gravity distance. Gravity distance is the distance over which a guideline is relevant to the alignment of content. For example, the gravity of Guideline 342 might not extend to Graphic Element 365, which is positioned on the opposite side of the page 300. In one embodiment of the present invention, gravity is a preset system parameter. In another embodiment of the present invention, a user sets gravity according to user preference and application needs. In yet another embodiment of the present invention, gravity is set as a fraction of page width.

The electronic page presented in FIG. 3 includes an IP 320 through which a user enters content into the page 300. Using a pointer, such as a stylus 255 or a pointing device 265, the user indicates to the computer system 200 a location on the page 300 for content entry. After indicating the IP 320, the user can begin entering content.

If a user selects an IP 320 without precisely aligning the IP 320 to the content of the existing document object 310 and begins entering content at that spatial location 320 on the page 300, then the new content will be misaligned with the content of the existing document object 310. The present invention can avoid this misalignment condition, which is usually undesirable, by automatically adjusting the IP 320 so that the new content is aligned to the existing content.

If a user selects an IP at Position 320 as illustrated in FIG. 3, then the present invention can shift the IP to Position 380 so that the new content is aligned to the existing content in the existing document object 310. In one embodiment of the present invention, the IP 320 shifts into alignment 380 after the user selects the IP position but before the IP appears on the page 300. In other words, if a user selects an IP position 320 that will result in content that is out of alignment with preexisting content 310, then a computer-implemented process moves the IP 320 into a position of alignment 380 and displays the aligned IP 380 on the electronic page 300. In another embodiment of the present invention, the IP 320 shifts into alignment after the user enters the new content. In other words, if a user selects a misaligned IP position 320 and enters new content from the misaligned IP position 320, then a software-based process moves the IP 320 into a position of alignment 380 after the user completes entering the new content. The newly-entered content follows the IP movement and thus snaps into alignment with the content of the preexisting document object 310. In yet another embodiment of the present invention, when a user selects an IP position 320 that is out of alignment, the electronic page displays both the misaligned IP 320 and the aligned IP 380, so that the user can choose to enter content from either IP 320, 380.

Figure 6:
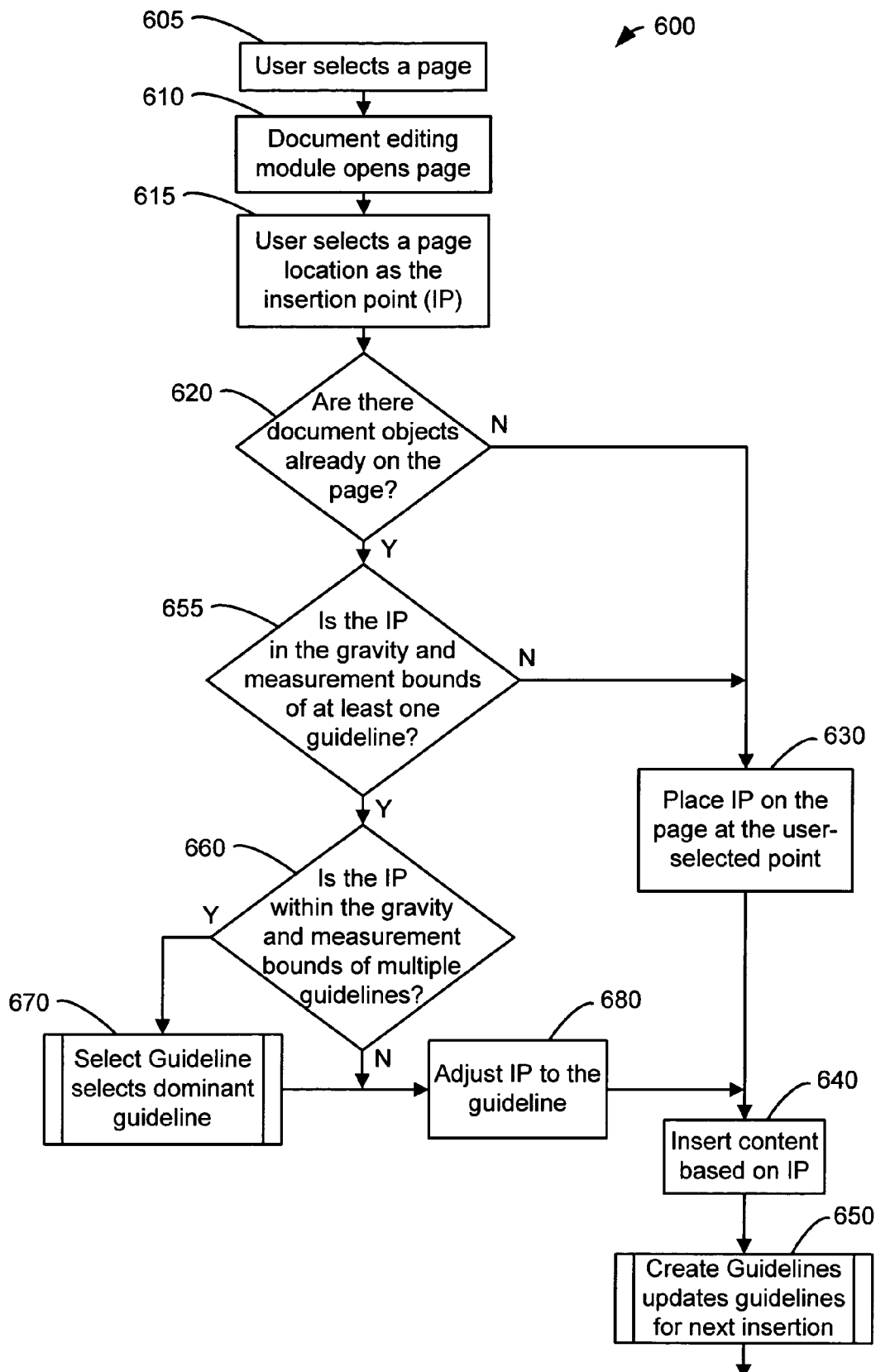
FIG. 6 is a flow diagram illustrating a process for inserting a document object into an electronic page by aligning an IP to a guideline of an existing object in accordance with an exemplary embodiment of the present invention.

An exemplary process for implementing this positional adjustment can include measuring the displacement between IP 320 and Guideline 331 and moving IP 320 to Position 380 so that the shifted IP 380 is aligned with Guideline 331. FIG. 6, which is described below, illustrates a flow chart for an exemplary adjustment process.

Whereas FIG. 3 illustrates an electronic page with a text-based document object 310 and an IP 320, FIG. 4 illustrates an electronic page 400 with two document objects, one of which has textual content embedded in an exemplary graphic.

The left document object 405 depicted in FIG. 4 is a graphical representation 408 of a computer storage device with textual content 410. Horizontal guidelines 430 trace each line of content while Guideline 431 and Guideline 432 specifically trace the first and second lines of content respectively. Vertical Guidelines 440, 441, and 442 indicate the margin, first tab stop, and second tab stop respectively. The right document object 310 is a reproduction of the exemplary document object 310 that is illustrated in FIG. 3 with similar vertical and horizontal guidelines 330-340.

FIG. 4 illustrates an exemplary scenario in which a user enters inserts a graphic document object 405 and its content 410 at an arbitrary position on the electronic page 400. After this entry, the user enters a second, non-graphic document object 310 at a misaligned position on the electronic page 400. The user inserted the second document object 310 into the page 400 by "cutting" the object from another page (not shown) and inserting it into the illustrated page 400, for example.

FIG. 4 further illustrates a capability of the present invention to align the content 310 of a newly-entered document object 310 relative to the content 410 of a previously-entered document object 405. The present invention can adjust the position of the non-graphic document object 310 so that its content is aligned to the content 410 of the other document object 405, which the user previously inserted. The horizontal guidelines 330, 430 of the document objects 405, 310 facilitate measuring vertical misalignment, which corresponds to the adjustment distance that is needed to bring the content into relative alignment. A computer-implemented process moves the non-graphic document object 310 vertically, as indicated by the arrows 460, until Guideline 431 overlays Guideline 332.

In one embodiment of the present invention, software in the document editing module 114, which is illustrated in FIGS. 1 and 2, aligns each line of content separately to provide line-to-line alignment for text blocks with slightly different line heights. For example, the contents of the graphic document object 405 and the non-graphic document object 300 could be formatted with 1.25 line spacing and 1.35 line spacing respectively. For this situation, the present invention can adjust the vertical position of the first line of content in the non-graphic document object 310 until Guideline 332 overlays Guideline 431. Similarly adjusting the second line of content until Guideline 331 overlays Guideline 432 aligns the second line of content in both document objects 405, 310. Separately adjusting each line of textual content brings the full content of both document objects into alignment.

FIG. 5 illustrates the application of guidelines in a graphic-orientated electronic page 500 in accordance with an exemplary embodiment of the present invention. The electronic page 500 includes a document object 510 that contains a graphical illustration 520 of a device and a document object 570 that contains textual content 575, 580 that describes specific features of the device. The figure also presents guidelines 560, 565, 593, 596 that facilitate alignment between the device features and the content 575, 580.

A graphical representation 520 of a flat-panel computer display terminal is surrounded by a larger selection box 530 with protruding manipulation handles 540. A vertical guideline 550 marks the center of the flat-panel display, which is offset from the center of the selection box 530 and the manipulation handles 540. Guideline 560 and Guideline 565 respectively mark the top of the flat-panel display and its base. The illustrated guidelines 550, 560, 565 that are associated with the flat-panel display document object 510 are independent of the selection box 530 and the manipulation handles 540. Consequently, the guidelines 550, 560, 565 facilitate alignment of content on the page 500 to features of flat-panel display irrespective of the selection box 530 or the manipulation handles 540.

A text-oriented document object 570 contains two smaller document objects, each of which holds content that describes a specific feature of the flat-panel display 520. One of the two smaller document objects 575 is a block of textual and graphic content related to the top of the flat-panel display 520. The content describes the top of the display, and an embedded arrow 578 serves to point out the specific device feature. Guideline 593 traces the center of the first line of textual content and the center of the embedded arrow 578. As illustrated, the text block 575 and its embedded arrow 578 are misaligned with the top of the flat-panel display. To align the content 575 and the arrow 578 to the top of the flat panel display, the present invention moves the content of the small document object 575 vertically until Guideline 593 overlays Guideline 560.

The other smaller document object 580 includes a block of textual content related to the base of the flat-panel display 520. Guideline 596 indicates the centerline of the first line of content in Document Object 580. As illustrated, the textual content 580 is misaligned with the device feature to which it refers. To bring it into alignment, the present invention moves the content of Document Object 580 vertically until Guideline 596 overlays Guideline 565.

FIG. 5 also illustrates a vertical guideline 583 associated with the group of product-feature document objects 570, 580, 575. Guideline 583 facilitates the alignment of the content of Document Object 575 in relation to Document Object 580, which are illustrated in an aligned state. Guideline 583 also facilitates the alignment of Document Object 575 and Document Object 580 within Document Object 570. In other words, Guideline 583 represents a left text margin for Document Object 575, a left text margin for Document Object 580, and/or a text alignment guideline for Document Object 570.

Exemplary Process for Aligning Content, FIG. 6

FIG. 6 is a flow diagram illustrating a process 600 for inserting a document object into an electronic document by aligning an IP to a guideline of an existing object in accordance with an exemplary embodiment of the present invention. Process 600 is an exemplary process for implementing the alignment illustrated in FIG. 3 and described above.

The present invention can include multiple computer programs which embody the functions and/or implement the steps described herein according to the exemplary flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary flow charts and screen displays and associated description in the application text, for example.

Therefore, disclosure of a particular set of program code instructions is not considered necessary for an adequate understanding of how to make and use the invention. The inventive functionality of the claimed computer program will be explained in more detail in the following description in conjunction with the remaining figures illustrating the functions and program flow.

Certain steps in the processes described must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Referring now to FIG. 3 and FIG. 6, at Step 605, a user selects an electronic page 300 for editing. At Step 610, the document editing module 114 responds to the user and opens an electronic page 300 that may or may not contain an existing document object 310. At Step 615, the user selects a location 320 on the page 300 as the insertion point for entering content. The user may implement this selection by placing a pointing device 265, such as a mouse or a stylus, anywhere on the two-dimensional surface of the page 300 while viewing a user display such as a monitor 270 or a tablet 250.

At Step 620, the document editing module 114 determines if the page 300 contains one or more existing document objects 310. If the page 300 contains existing document objects 310, the document editing module 114 can adjust the IP 320 to align new content with existing content 310, as discussed below. If the page 300 does not contain any existing document objects 310, then at Step 630, the document editing module 114 retains the location of the IP 320 that the user selected in Step 615. At Step 640, the user enters content and the document editing module 114 inserts the content into the electronic page based on the IP 320. In other words, if a user selects a content-entry location 320 of a blank electronic page 300, then the document editing module 114 places the user's content at that location 320.

After the user enters content into the electronic page 300, Sub-process Create Guidelines 650, which is a routine in the guideline module 208 illustrated in FIG. 2, creates guidelines aligned to features of the new content. In one embodiment of the present invention, the guidelines are vertical and horizontal guidelines aligned with formatting features of the new textual content.

If the user selects an insertion point location in an electronic page 300 that contains an existing document object 310, then the document editing module 114 adjusts the IP 320 following Steps 655-680. At Step 655, the document editing module 114 determines if the IP 320 is within the gravity and measurement boundary of at least one guideline. In one embodiment of the present invention, the determination is based on rules contained in the guideline module 208. If the IP 320 lies outside of the gravity and measurement boundary of each guideline 330-350 on the page 300 or if each document object 310 does not have any guidelines 330-350, then the document editing module 114 executes Step 630 and inserts the new content at the user-selected IP 320.

If at least one guideline 330-350 applies to the IP 320, then at Step 660, the document editing module 114 determines if the IP 320 is within the gravity and measurement boundaries of multiple guidelines 330-350. If the determination is positive, then the document editing module 114 implements Sub-process Select Guideline 670, which is contained in the guideline module 208, to select a single guideline to apply to the IP 320. In one embodiment of the present invention, Sub-process 670 selects the guideline 330-350 on the basis of its relative position to the IP 320. For example, Sub-process 670 can select the guideline 331 that is adjacent or closest to the IP 320.

Sub-process 670 can apply various rules contained in the guideline module 208 to determine the dominance of one guideline relative to another. In one embodiment of the present invention, guideline hierarchy is user-selected. In another embodiment of the present invention, guideline dominance is a function of position on the page 300. For example, a guideline that is left of the IP 320 can be dominant over a guideline that is right of the IP.

After selecting a single guideline 330-350 to apply to the IP 320, the document editing module 114 moves the IP 320 from the user selected location 320 to a position 380 aligned to the selected guideline 331. At the adjusted IP 380, the document editing module 114 insets the new, user-entered content into the page 300. By aligning new content with existing content 310, the document editing module 114 enhances readability and usability of the page 300 and its content.

Figure 7A:
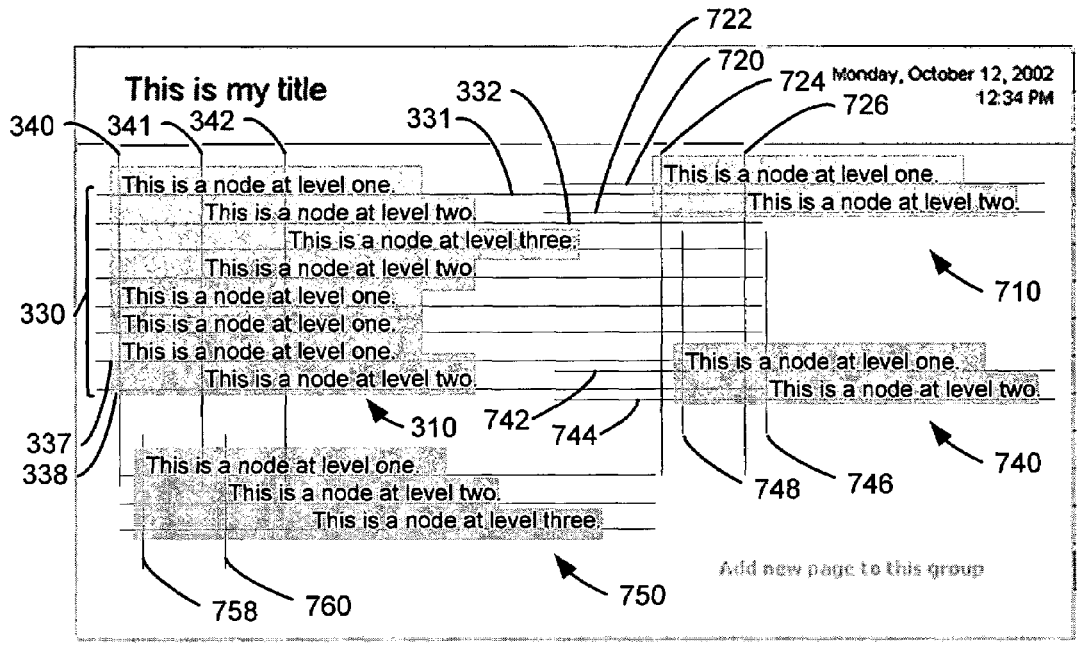
FIG. 7A is a display image illustrating an electronic page with several document objects that have misaligned contents with respect to one another prior to alignment in accordance with an exemplary embodiment of the present invention.
Figure 7B:
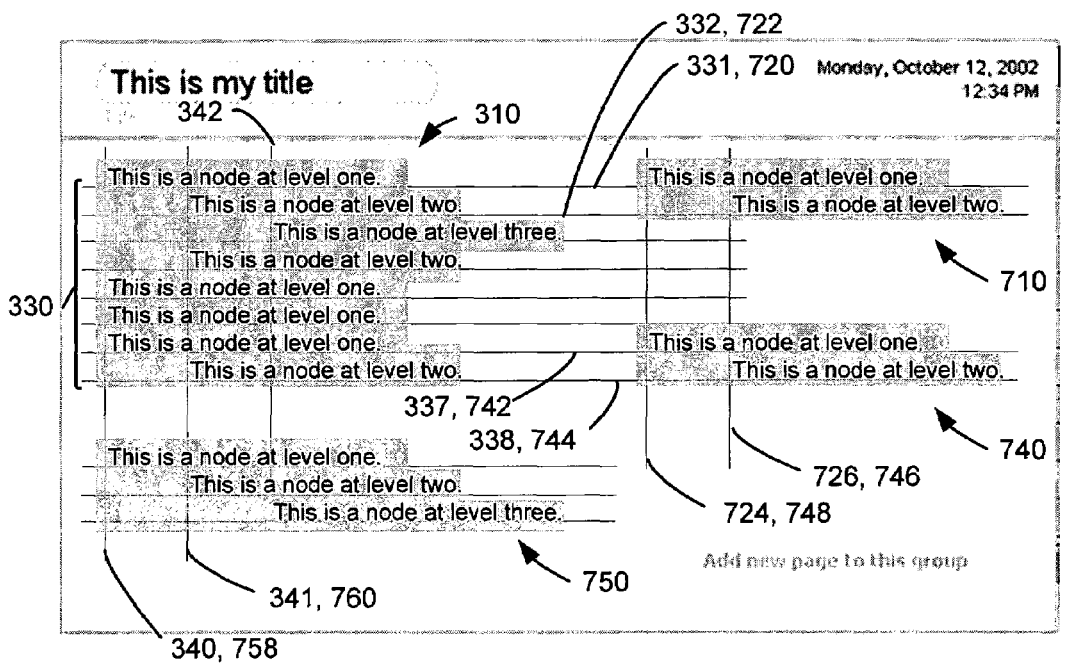
FIG. 7B is a display image illustrating the electronic document of FIG. 7A following content alignment for the document objects in accordance with an exemplary embodiment of the present invention.
Figure 8:
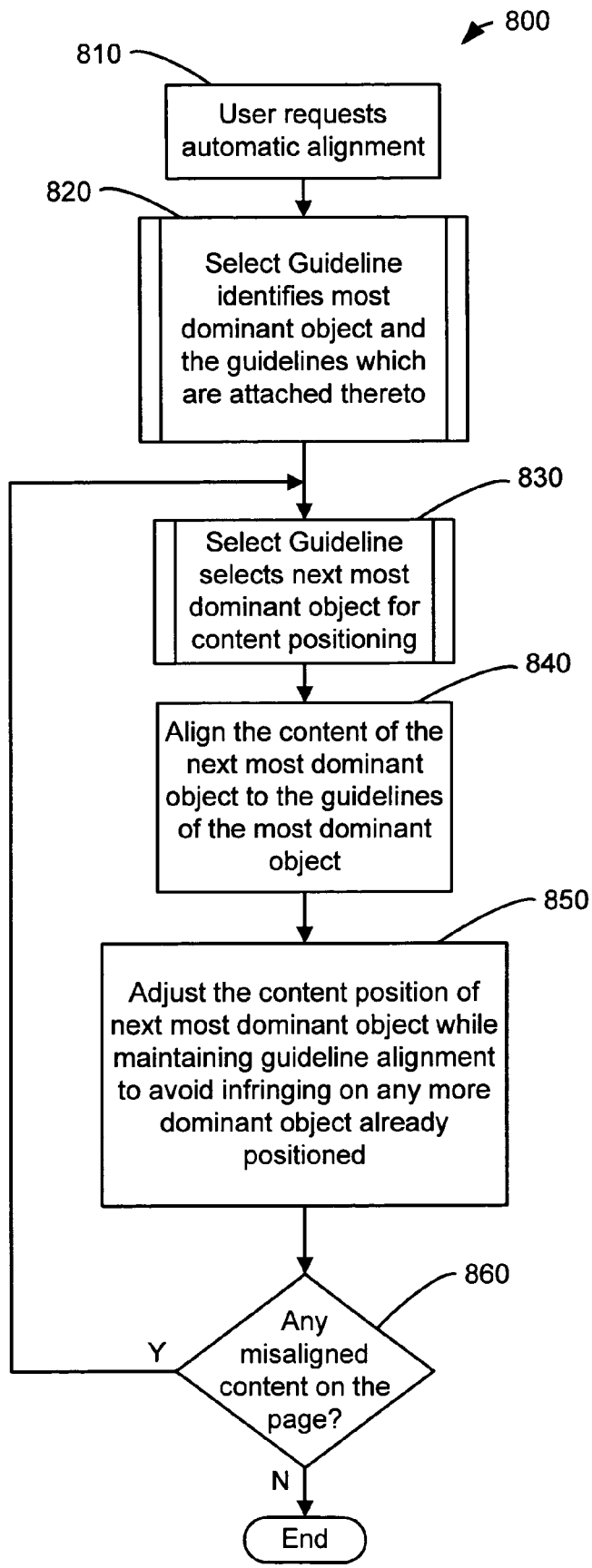
FIG. 8 is a flow diagram illustrating a process for aligning the content of document objects in an electronic document with respect to one another in accordance with an exemplary embodiment of the present invention.

Exemplary Pages and Process for Organizing a Page, FIGS. 7A, 7B, 8

In addition to organizing content as a user is entering the content into a page, in one embodiment, the present invention can organize a page after the page contains multiple document objects with misaligned content. FIG. 7A is a display image illustrating a page 700A with four document objects that are misaligned with respect to one another prior to alignment in accordance with an exemplary embodiment of the present invention. The electronic page 700A presents Document Objects 310, 710, 740, and 750, each with horizontal and vertical guidelines attached to content features relevant to content alignment. FIG. 7B is a display image of the same page 700B with the same document objects 310, 710, 740, 750 and same guidelines following alignment by an exemplary embodiment of the present invention. FIG. 8 is a flow diagram illustrating an exemplary process 800 for aligning the contents of document objects with respect to one another in accordance with an exemplary embodiment of the present invention. FIG. 8 furthermore illustrates an exemplary process 800 for organizing the content of the page 700A presented in FIG. 7A to provide the aligned format 700B presented in FIG. 7B. Process 800 is described below in reference to the exemplary pages illustrated in FIG. 7A and FIG. 7B.

Referring now to FIGS. 7A, 7B, and 8, at the beginning of Process 800, a page 700A includes multiple document objects 310, 710, 740, and 750 with misaligned content, for example as illustrated in FIG. 7A. At Step 810, a user enters a request into the electronic writing tablet 200 to automatically align the content of the page 700A. At Step 820, the document editing module 114 engages the guideline module 208 to identify the most dominant document object and the guidelines attached thereto.

In one embodiment of the present invention, the document editing module 114 determines object dominance on the basis of position on the page 700A. In one embodiment of the present invention, the further left a document object is positioned on the page 700A, the greater its dominance. In one embodiment of the present invention, the higher the document object is positioned on the page 700A, the greater its dominance. In one embodiment of the present invention, a document object that is in the top, left-hand corner of the page 700A has the greatest dominance. In another embodiment of the present invention, user preference sets forth the dominance of a document object. Those skilled in the computer-based document arts appreciate that the present invention supports a variety of rules and processes for determining the alignment dominance of one document object relative to another.

For exemplary page 700A, the document editing module 114 identifies Document Object 310 as dominant over the other objects 710, 740, 750. This identification establishes the position of the content of the most dominant document object, for example Document Object 310. At Step 830, the document editing module 114 selects the next most dominant document object for content positioning relative to the most dominant object 310. For exemplary page 700A, the document editing module selects Document Object 710.

At Step 840, the document editing module 114 aligns the content of the second most dominant document object 710 with the content of the most dominant document object 310. For exemplary page 700A, the document editing module 114 adjusts the position of the content of Document Object 710 into alignment with the content of Document Object 310 according to the displacement of Guidelines 720 and 722 relative to Guidelines 331 and 332. After alignment, Guidelines 720 and 722 overlay Guidelines 331 and 332 respectively, as illustrated in FIG. 7B.

At Step 850, the document editing module 114 adjusts the position of the content of the next most dominant document object, while maintaining the guideline alignment achieved in Step 840, to avoid infringing other, more dominant document objects. In other words, at Step 850, the document editing module 114 can fine-tune the position of the document object content that was positioned in Step 840. For exemplary page 700B, the document editing module 114 determines if the new, adjusted position of the content of Document Object 710 interferes with another document object. Since FIG. 7B does not illustrate an interfering object, the page 700B does not require further positional adjustment. If fine-tuning positional adjustment was needed, the document editing module 114 would adjust the horizontal position of Document Object 710's content while maintaining its vertical position.

At Step 860, the document editing module 114 determines if there are additional document objects on the page with contents that need to be aligned. If the determination is positive, the document editing module 114 iterates Steps 830, 840, 850 for each document object on the page. The process ends when the content of each document object is aligned.

For exemplary page 700A, the second processing iteration aligns the content of Document Object 740 with the contents of Document Object 310 and Document Object 710. Moving Document Object 740's contents vertically overlays its Guidelines 742 and 744 respectively with Document Object 310 Guidelines 337 and 338 respectively, thereby aligning Document Object 740's content relative to Document Object 310's content. Moving horizontally while keeping these guidelines 742, 744, 337, 338 in alignment facilitates the alignment of Document Object 740's contents with respect to Document Object 710's content. The document editing module 114 moves Document Object 740's contents horizontally until Guidelines 748 and 746 overlay Guidelines 724 and 726 respectively. When Guidelines 748, 746, 724, and 726 are in alignment, the content of Document Object 740 is positioned into alignment with the content of both Document Object 710 and Document Object 310.

The third processing iteration for exemplary page 700B aligns the content of Document Object 750 with the content of Document Object 310 by overlaying Guidelines 758 and 760 with Guidelines 340 and 341 respectively. When the third processing iteration on exemplary page 700A is complete, the page 700B is organized and the content is aligned as illustrated in FIG. 7B. With the content presented in this aligned format, a user can efficiently access information.

CONCLUSION

One skilled in the art would appreciate that the present invention supports aligning the content of multiple documents objects relative to one another in an electronic page. An insertion point for the addition of new content can be placed on an electronic document page outside of an existing document object. In response to placing the IP on the page, a computer-implemented method can adjust the position of the IP so that the new content is aligned in relation to the existing content. When a page has several existing document objects, a computer-implemented method can organize the page so that the content of each document object is aligned relative to the other document objects.

Guidelines, which provide an indication of relative displacement, can emanate from features of new and existing content that are relevant to alignment. A region of gravity and a measurement boundary for each guideline can determine the circumstances, such as a spatial dominion, to which a guideline applies. Rules applied to the document objects on a page can set forth the dominance, or alignment hierarchy, of each document object on the page.

From the foregoing, it will be appreciated that the preferred embodiment of the present invention overcomes the limitations of the prior art. From the description of the preferred embodiment, equivalents of the elements shown herein will suggest themselves to those skilled in the art, and ways of constructing other embodiments of the present invention will suggest themselves to practitioners of the art. Therefore, the scope of the present invention is to be limited only by the claims below.

What is claimed is:

1. A computer-implemented method for inserting input into an electronic document page comprising:
   placing a pointer on the electronic document page;
   scanning the electronic document page for existing objects,
   determining a dominant existing object;
   identifying content guidelines of the dominant existing object;
   selecting a content-based guideline of the dominant existing object that is adjacent to the pointer, the content-based guideline being selected from a plurality of content-based guidelines by applying rules to determine which one of the plurality of content-based guidelines is dominant, the plurality of content-based guidelines comprising the following: a gravity parameter defining a distance beyond which the plurality of content-based guidelines are suppressed, vertical lines and horizontal lines defined by an equation of a line, the vertical lines being attached to content features of the dominant existing object and the horizontal lines being aligned to text comprising the dominant existing object, wherein at least one of the vertical lines intersects substantially perpendicularly with at least one of the horizontal lines, wherein applying the rules to determine which one of the plurality of content-based guidelines is dominant comprises one of the following: using guideline hierarchy and applying the rules with guideline dominance being a function of page position and the plurality of content-based guidelines move with the dominant existing object when the dominant existing object is moved;
   aligning the pointer to the content-based guideline for inserting the input; and
   creating a new object wherein the content of the new object is aligned with the selected content guideline of the dominant existing object,
   wherein the input comprises an input document object, wherein the content-based guideline is an existing content-based guideline, and wherein the input document object comprises content, and wherein the method further comprises the step of identifying an input content-based guideline of the input document object, and wherein the aligning step comprises positioning the content of the input document object on the page so that the input content-based guideline is aligned to the existing content-based guideline.

2. The method of claim 1, wherein the input document object comprises a graphic.

3. The method of claim 2, wherein the input document object further comprises textual content.

4. The method of claim 1, wherein the input comprises text.

5. The method of claim 1, wherein the dominant existing object comprises text and the content-based guideline is horizontally aligned with the text.

6. The method of claim 1, wherein the dominant existing object comprises text and the content-based guideline is a vertical guideline that is aligned to a format feature of the text.

7. The method of claim 1, wherein the dominant existing object comprises text and the content-based guideline is aligned to a reflow bar of the existing object.

8. The method of claim 1, further comprising the step of: if no existing object is detected in the scanning step, inserting input at the placement of the pointer.

9. The method of claim 1, wherein:
the existing dominant object comprises existing text;
the input comprises input text;
the content-based guideline is aligned with a feature of the existing text; and
the aligning step further comprises aligning the input text to the content-based guideline.

10. A computer-readable storage device storing a set of instructions for inserting input in an electronic page, the instructions when executed by a computer performing:
placing a pointer on the electronic page;
scanning the electronic page for existing objects;
determining a dominant existing object;
identifying content guidelines of the dominant existing object;
selecting a content-based guideline of the dominant existing object that is adjacent to the pointer, the content-based guideline being selected from a plurality of content-based guidelines by applying rules to determine which one of the plurality of content-based guidelines is dominant, the plurality of content-based guidelines comprising the following: a gravity parameter defining a distance beyond which the plurality of content-based guidelines are suppressed, vertical lines and horizontal lines defined by an equation of a line, the vertical lines being attached to content features of the dominant existing object and the horizontal lines being aligned to text comprising the dominant existing object, wherein at least one of the vertical lines intersects substantially perpendicularly with at least one of the horizontal lines, wherein applying the rules to determine which one of the plurality of content-based guidelines is dominant comprises one of the following: using guideline hierarchy and applying the rules with guideline dominance being a function of page position and the plurality of content-based guidelines move with the dominant existing object when the dominant existing object is moved;
aligning the pointer to the content-based guideline for inserting the input;
creating a new object wherein the content of the new object is aligned with the selected content guideline of the dominant existing object,
wherein the input comprises an input document object, wherein the content-based guideline is an existing content-based guideline, and wherein the input document object comprises content, and wherein the method further comprises the step of identifying an input content-based guideline of the input document object, and wherein the aligning step comprises positioning the content of the input document object on the page so that the input content-based guideline is aligned to the existing content-based guideline.

11. The device of claim 10, wherein the determining step comprises determining a dominant existing object on the basis of position on the electronic page.

12. The device of claim 10, wherein the determining step comprises determining that the existing object that is closest to the left side of the electronic page is the dominant existing object.

13. The device of claim 10, wherein the determining step comprises determining that the existing object that is closest to the top side of the electronic page is the dominant existing object.

14. The device of claim 10, wherein the determining step further comprises identifying the existing object that is closest to the top left corner of the electronic page.

15. A system for inserting input into an electronic document page, the system comprising:
a memory storage for maintaining a database; and
a processing unit coupled to the memory storage, wherein the processing unit is operative to:
place a pointer on the electronic document page;
scan the electronic document page for existing objects,
determine a dominant existing object;
select a content-based guideline of the dominant existing object that is adjacent to the pointer, the content-based guideline being selected from a plurality of content-based guidelines by applying rules to determine which one of the plurality of content-based guidelines is dominant, the plurality of content-based guidelines comprising the following: a gravity parameter defining a distance beyond which the plurality of content-based guidelines are suppressed, vertical lines and horizontal lines defined by an equation of a line, the vertical lines being attached to content features of the dominant existing object and the horizontal lines being aligned to text comprising the dominant existing object, wherein at least one of the vertical lines intersects substantially perpendicularly with at least one of the horizontal lines, wherein applying the rules to determine which one of the plurality of content-based guidelines is dominant comprises one of the following: using guideline hierarchy and applying the rules with guideline dominance being a function of page position and the plurality of content-based guidelines move with the dominant existing object when the dominant existing object is moved;
align the pointer to the content-based guideline for inserting the input; and
create a new object wherein the content of the new object is aligned with the selected content guideline of the dominant existing object,
wherein the input comprises an input document object, wherein the content-based guideline is an existing content-based guideline, and wherein the input document object comprises content, and wherein the method further comprises the step of identifying an input content-based guideline of the input document object, and wherein the aligning step comprises positioning the content of the input document object on the page so that the input content-based guideline is aligned to the existing content-based guideline.

16. The system of claim 15, wherein the processing unit being operative to align further comprises the processing unit being operative to align before text has been received for the input.

17. The system of claim 15, wherein the processing unit being operative to align further comprises the processing unit being operative to align after text has been received for the input.

* * * * *